US 8,606,234 B2

(12) United States Patent
Pei et al.

(10) Patent No.: US 8,606,234 B2
(45) Date of Patent: Dec. 10, 2013

(54) METHODS AND APPARATUS FOR PROVISIONING DEVICES WITH SECRETS

(75) Inventors: Mingliang Pei, Palo Alto, CA (US); Yuequin Lin, Cupertino, CA (US); Bruce Ong, San Francisco, CA (US); Jeff Burstein, San Jose, CA (US); Ananta K. Vadlamani, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 628 days.

(21) Appl. No.: 12/651,255

(22) Filed: Dec. 31, 2009

(65) Prior Publication Data
US 2011/0159848 A1    Jun. 30, 2011

(51) Int. Cl.
H04M 1/66    (2006.01)
H04M 1/68    (2006.01)
H04M 3/16    (2006.01)

(52) U.S. Cl.
USPC ............................ 455/411; 455/410; 455/466

(58) Field of Classification Search
USPC .......... 455/410, 411, 466; 713/172, 171, 185, 713/150
See application file for complete search history.

(56) References Cited

U.S. PATENT DOCUMENTS

| | | | |
|---|---|---|---|
| 7,548,620 B2 | 6/2009 | Popp | |
| 7,555,783 B2 | 6/2009 | Enright | |
| 2004/0139329 A1* | 7/2004 | Abdallah et al. | 713/182 |
| 2005/0210252 A1 | 9/2005 | Freeman et al. | |
| 2006/0069916 A1* | 3/2006 | Jenisch et al. | 713/172 |
| 2007/0192829 A1 | 8/2007 | Ford | |
| 2007/0197237 A1 | 8/2007 | Powell et al. | |
| 2009/0205028 A1 | 8/2009 | Smeets et al. | |
| 2010/0125635 A1* | 5/2010 | Axelrod et al. | 709/206 |
| 2011/0016322 A1* | 1/2011 | Dean et al. | 713/171 |

FOREIGN PATENT DOCUMENTS

WO    WO 0101627 A2    1/2001

OTHER PUBLICATIONS

Esnouf et al., "Designing a Web Publishing Infrastructure with Microsoft ISA Server and Gemalto SA Server and Gemalto SA Server Based on One Time Password Technology." Gemalto, www.gemalto.com, Gemalto, Inc 2007, 33 pages.
"VeriSign Identity Protection (VIP) Mobile Credential for Protecting Consumer Online Accounts Now Available on Apple App Store," VeriSign, Inc, Copyright 2009, VeriSign, Inc, 1 page.
"VIP Access for Mobile: Making Consumer Two-Factor Authentication Simple and Cost-Effective," VeriSign, Inc, Oct. 15, 2009, Copyright 2009, VeriSign, Inc, 1-7 pages.

* cited by examiner

*Primary Examiner* — Ajit Patel
(74) *Attorney, Agent, or Firm* — Lowenstein Sandler LLP

(57) ABSTRACT

A method for provisioning a mobile device with a secret to be used as a basis for generating One-Time passwords includes receiving a first request using a first communications method. The first request includes a mobile device identifier. The method also includes sending a credential message using a second communications method. The credential message includes an authentication credential. The method also includes receiving a second request using a third communications method different from the second communications method. The second request includes information based upon the authentication credential sent by the provisioning service. The method also includes sending the secret if the authentication credential in the credential message corresponds to the information based upon the authentication credential in the second request.

21 Claims, 8 Drawing Sheets

METHODS AND APPARATUS FOR PROVISIONING DEVICES WITH SECRETS

FIELD OF THE INVENTION

The present invention relates generally to provisioning devices with secrets. The secrets may be used as a basis for generating One-Time Passwords. More particularly, the present invention relates to methods and apparatus for authenticating devices and provisioning the authenticated devices with secrets.

BACKGROUND

A common step in deciding whether to grant a request for access to data or services in a network is to authenticate the requesting user. Authentication is the process of establishing or confirming one or more characteristics associated with a user or a request. For example, authentication may include confirming a user's identify or confirming that a request is generated by a particular device. In computer networks, authentication commonly involves the use of passwords. Knowledge of a password is assumed to warrant that the user is authentic. Typically, a user is initially assigned or selects a password, and upon each subsequent use the user must provide the password. A password is considered a first authentication factor because it is something the user knows that presumptively no one else knows.

Since passwords are vulnerable to hackers, security can be improved by adding a second authentication factor. Second authentication factors generally include something the user has (as opposed to something the user knows). Second authentication factors preferably include credentials that can be generated systematically and verified efficiently. Common sources of second authentication factors include smart cards, tokens, and other similar security devices that may be referred to generally as security tokens.

A security token can include one or more secrets that may be shared with an authentication service. The token can use the secret as the basis for generating credentials such as One-Time Passwords (OTPs). An OTP can be a number or alphanumeric string that is generated once and is not reused. The token can generate an OTP and the user can send the OTP to an authentication service. The authentication service generates an OTP using its copy of the secret. The user is authenticated if the OTP determined by the authentication service matches the OTP provided by the user.

Secrets can be stored in numerous different types of devices and used as the basis for generating OTPs. As examples, secrets may be stored in personal computers, notebook computers, cell phones, and other devices. One challenge faced by authentication services is how to provide secrets to these types of devices in a secure and user friendly manner. Users prefer provisioning methods that are user friendly, while authentication services require provisioning methods that are secure. Unlike security tokens, that are typically provisioned with a secret during manufacture, these devices are usually not provisioned with a secret until after purchase by a user. There is a tradeoff between security and usability when using conventional methods of provisioning devices. Secure methods are generally not user friendly, and user friendly methods are generally not secure. This is because secure methods typically require multiple levels of user input for authentication, while user friendly methods require little or no user input for authentication. Authentication to acquire a secret generally requires confirmation that the request is associated with a particular device. For example, a mobile device such as a cell phone may be required to provide information that confirms it generated a request for a secret.

Thus, there is a general need in the art for improved methods and apparatus for provisioning devices with secrets.

SUMMARY

Embodiments of the present invention provide secure and user friendly methods and apparatus for provisioning devices with secrets. Merely by way of example, some embodiments provide methods that include two-channel authentication to ensure that the device requesting the secret is the device receiving the secret. Some embodiments also provide user friendly methods that require minimal user input. Because the methods are user friendly, it is more likely that users will acquire and use secrets to enable two-factor authentication.

In accordance with an embodiment of the invention, a method for provisioning a mobile device with a secret to be used as a basis for generating One-Time Passwords includes sending, from the mobile device to the provisioning service, a first request for the secret using a communications method other than Short Message Service. The first request may include a mobile device identifier comprising a telephone number, a Mobile Identification Number, or an Electronic Identification Number of the mobile device. The method also includes receiving, from the provisioning service at the mobile device, a Short Message Service message containing authentication credentials. The authentication credentials may include a nonce and the mobile device identifier. The method also includes sending, from the mobile device to the provisioning service, a second request for the secret using a communications method other than Short Message Service. The second request may include the nonce received from the provisioning service and the mobile device identifier. The mobile device is authenticated if the nonce and the mobile device identifier sent in the Short Message Service message from the provisioning service correspond to the nonce and the mobile device identifier received from the mobile device in the second request. If the mobile device is authenticated, the secret that is used as the basis for generating One-Time Passwords is sent from the provisioning service to the mobile device over a communications method other than Short Message Service. The communications method can use an encrypted connection such as HTTP over SSL or TLS.

In accordance with another embodiment of the invention, a method for provisioning a mobile device with a secret to be used as a basis for generating One-Time Passwords includes sending, from the mobile device to a provisioning service, a first request for the secret using a first communications method. The first request may include a mobile device identifier. The method also includes receiving, from the provisioning service at the mobile device, a credential message using a second communications method. The credential message may include an authentication credential. The method also includes sending, from the mobile device to the provisioning service, a second request using a third communications method different from the second communications method. The second request may include information based upon the authentication credential received from the provisioning service. The method also includes receiving, from the provisioning service at the mobile device, the secret if the information based upon the authentication credential in the second request corresponds to the authentication credential in the credential message.

In accordance with another embodiment of the invention, a method for provisioning a mobile device with a secret to be used as a basis for generating One-Time Passwords includes receiving, from the mobile device at the provisioning service, a first request using a first communications method. The first request may include a mobile device identifier. The method also includes sending, from the provisioning service to the mobile device, a credential message using a second communications method. The credential message may include an authentication credential. The method also includes receiving, from the mobile device at the provisioning service, a second request using a third communications method different from the second communications method. The second request may include information based upon the authentication credential sent by the provisioning service. The method also includes sending, from the provisioning service to the mobile device, the secret if the authentication credential in the credential message corresponds to the information based upon the authentication credential in the second request.

In accordance with yet another embodiment of the invention, an apparatus configured to provision mobile devices with secrets includes a first receiving mechanism configured to receive from a mobile device a first request using a first communications method. The first request may include a mobile device identifier. The apparatus also includes a first sending mechanism configured to send to the mobile device a credential message using a second communications method. The credential message may contain an authentication credential. The apparatus also includes a second receiving mechanism configured to receive from the mobile device a second request using a communications method other than the second communications method. The second request may include information based upon the authentication credential. The apparatus also includes a second sending mechanism configured to send to the mobile device a secret if the authentication credential in the credential message corresponds to the information in the second request.

Numerous benefits are achieved using the present invention over conventional techniques. Some embodiments of the present invention provide secure methods of provisioning a device with a secret. For example, one embodiment includes a multi-step request process. In response to a first request, and out-of-band communications method can be used to send an authentication credential to a requesting device. The out-of-band communications method can be used to ensure the authentication credential is sent to the device associated with a particular mobile device identifier, while the authentication credential can be used to authenticate the device during a second request for the secret. Other embodiments of the present invention provide user friendly methods of provisioning a device with a secret. For example, in response to a request for a secret, one embodiment includes sending a message to the device that includes a uniform resource locator (URL). As explained more fully below, the URL can be used to confirm that the message was received by the device with minimal user input.

Depending upon the embodiment, one or more of these benefits may exist. These and other benefits are described throughout the specification and more particularly below.

DETAILED DESCRIPTION

Embodiments of the present invention provide secure and user friendly methods of provisioning devices with secrets that may be used as the basis for generating One-Time Passwords (OTPs). Some embodiments include secure methods that utilize multi-step request processes, include two-channel authentication, associate authentication credentials with particular mobile device identifiers, and/or encrypt authentication credentials and secrets prior to sending. Other embodiments provide user friendly methods that utilize uniform resource locators (URLs) to minimize user input.

Figure 1:
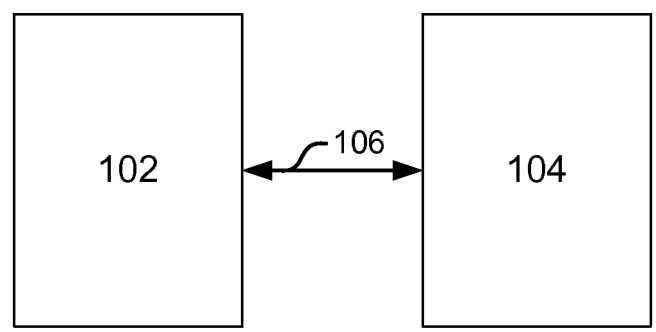
FIG. 1 is a simplified diagram of an exemplary system for provisioning mobile devices with secrets according to an embodiment of the present invention.

FIG. 1 is a simplified diagram of an exemplary system for provisioning mobile devices with secrets according to an embodiment of the present invention. The system illustrated in FIG. 1 includes a mobile device 102 and a provisioning service 104. The mobile device 102 and the provisioning service 104 are communicatively coupled via a communications link 106.

The mobile device 102 may include a cellular phone such as a smartphone, a handheld device such as a person digital assistance, a mobile computing device such as a laptop or notebook computer, or similar devices. The mobile device 102 may include typical software and hardware components as would be understood by one of ordinary skill in the art. For example, the mobile device 102 may include a visual display with means for user input in accordance with known techniques.

In an embodiment the mobile device 102 includes a memory and a central processing unit (CPU). The memory may be configured to store the information and instructions that can be executed by the CPU to perform at least part of the methods in accordance with embodiments of the present invention. As an example, the memory may include provisioning software with instructions for sending requests for secrets to provisioning service 104 and for receiving secrets from provisioning service 104. The memory may also include a software application with instructions for generating OTPs using the secret. The memory is not limited and may include magnetic storage media, optical storage media, flash memory, and the like. Similarly, the CPU is not limited and can be a general purpose microprocessor configured to execute instructions or an application specific integrated circuit (ASIC) that embodies at least a part of the instructions in software, firmware and/or hardware. One of ordinary skill in the art would recognize many variations, modifications, and alternatives.

The provisioning service 104 typically includes one or more computers and/or servers capable of communicating with the mobile device 102 and configured to carry out the steps described below to provision the mobile device with a secret. The computer(s) and/or server(s) may include typical hardware and software configurations as would be understood by one of ordinary skill in the art.

In an embodiment, each of the computer(s) and/or server(s) may include a memory and one or more CPUs. The memory may be configured to store the information and instructions that can be executed by the CPU(s) to perform at least part of the methods in accordance with embodiments of the present invention. As an example, the memory may include provisioning software with instructions for receiving and responding to a request for a secret from the mobile device 102. The memory may be local or remote and may include magnetic storage media, optical storage media, flash memory, and the like. Similarly, the CPU(s) is not limited and can be a general purpose microprocessor configured to execute instructions and/or an ASIC that embodies at least a part of the instructions in software, firmware and/or hardware. One of ordinary skill in the art would recognize many variations, modifications, and alternatives.

Although specific aspects and features of the mobile device 102 and the provisioning service 104 have been described, one of ordinary skill in the art will appreciate that a mobile device and a provisioning service suitable for use with methods and systems consistent with the present invention may contain additional and/or different hardware and software. Thus, the mobile device 102 and the provisioning service 104 are not limited to the exemplary aspects and features described above.

The mobile device 102 and the provisioning service 104 are configured to communicate using communications link 106. The communications link 106 preferably utilizes both a radio network, such as a cellular network, and a computer network, such as the Internet, for communications. The communications link 106, however, is not limited to these particular communications technologies. One of ordinary skill in the art will recognize that various aspects of the invention may be practiced utilizing these and other communications technologies in accordance with known techniques.

Figure 2:
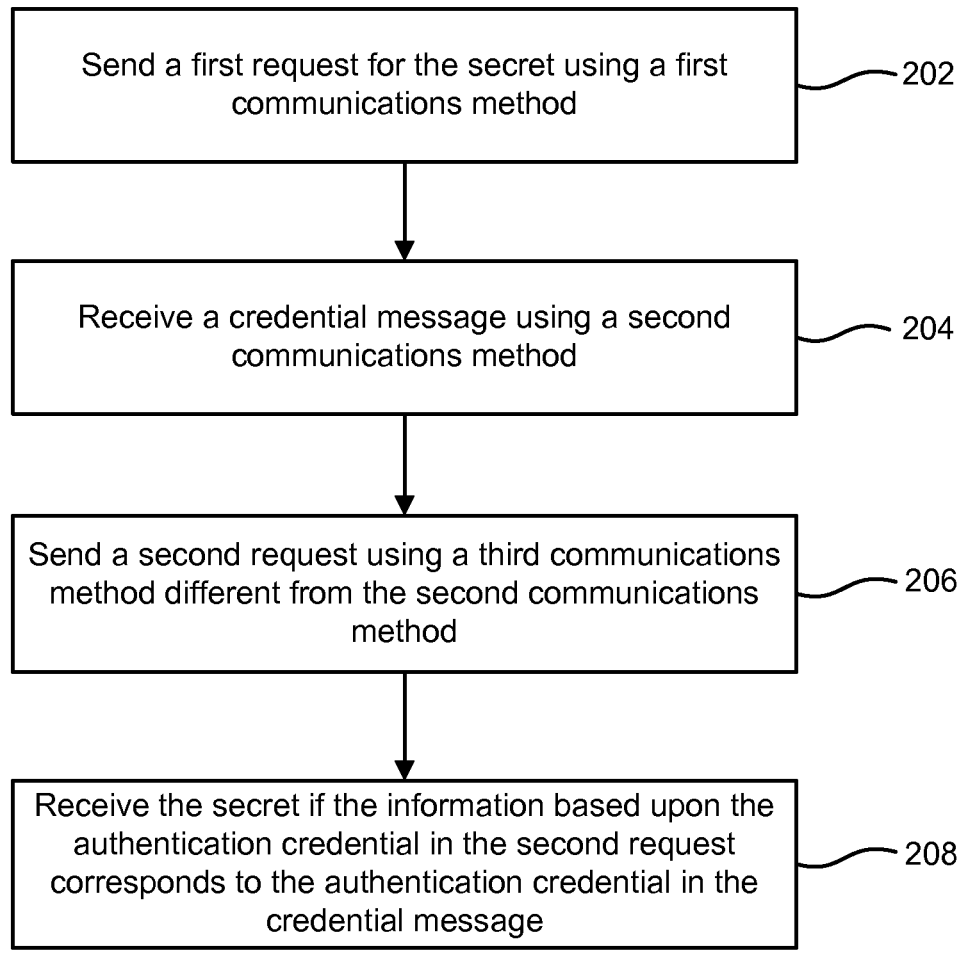
FIG. 2 is a simplified flowchart illustrating an exemplary method of obtaining a secret from a provisioning service according to an embodiment of the present invention.

FIG. 2 is a simplified flowchart illustrating an exemplary method of obtaining a secret from a provisioning service according to an embodiment of the present invention. The method is explained with reference to the exemplary system illustrated in FIG. 1. The method includes sending a first request for the secret using a first communications method (202). The first request may be sent from the mobile device 102 to the provisioning service 104.

In one embodiment the first request is generated and sent automatically during installation or as part of an initialization step of a provisioning application that may be embodied in software and stored in memory of the mobile device 102. As an example, a provisioning application may include instructions to check that the mobile device 102 includes a secret. The provisioning application may also include instructions to generate and send a first request for a secret to the provisioning service 104 if the mobile device 102 does not include a secret.

The first request is sent via the communications link 106 using a first communications method. Communications methods that may be used in accordance with embodiments of the present invention include, for example, voice connections over a cellular network, Short Message Service (SMS) messages over a cellular network, data transfer over a computer network using a file transfer protocol such as a hypertext transfer protocol (HTTP), email messages over a computer network, and the like. It will be appreciated by one of ordinary skill in the art that the methods of the present invention are not limited to these particular communications methods and may be practiced using any communications methods. Further, secure communications methods may be used in accordance with known techniques. For example, data transfer over a computer network may utilize transport layer security (TLS) or secure sockets layer (SSL).

The first request may include a mobile device identifier associated with the mobile device 102 making the request. A mobile device identifier may include a telephone number, a mobile identification number, and/or an electronic identification number associated with the mobile device 102. Alternatively, the mobile device identifier may include any identifier associated with a particular mobile device.

The exemplary method illustrated in FIG. 2 also includes receiving a credential message using a second communications method (204). The credential message may be sent from the provisioning service 104 to the mobile device 102 in response to the first request.

The credential message is received via the communications link 106 using a second communications method. In an embodiment, the second communications method is different from the first communications method. For example, the first communications method may include an HTTP request, and the second communications method includes an SMS message. In this example, the second communications method that includes an SMS message may be considered to be an out-of-band communications method because it is different from the first communications method that includes an HTTP request. One of ordinary skill in the art will appreciate that an out-of-band communications method can be used to improve security.

The credential message may include an authentication credential such as one or more nonces and/or the mobile device identifier sent with the first request. Alternatively, the mobile device identifier may be different from but based on the mobile device identifier included with the first request. The nonce(s) may be a code, such as an alphanumeric code, that is generated by the provisioning service 104 and associated with the mobile device identifier. In an embodiment, the authentication credential is encrypted by the provisioning service 104 using known encryption techniques and, after being received by the mobile device 102, the authentication credential is decrypted using known decryption techniques. In another embodiment, only the nonce(s) is encrypted and decrypted. The credential message may also include a digital signature.

The exemplary method illustrated in FIG. 2 also includes sending a second request using a third communications method that is different from the second communications method (206). The second request may be sent from the mobile device 102 to the provisioning service 104. The second request is sent via communications link 106. In an embodiment, the second communications method includes an SMS message and the third communications method includes an HTTP request over an encrypted connection such as SSL or TLS. The second request may include the authentication credential, or information based upon the authentication credential, that was received in step 204.

The exemplary method illustrated in FIG. 2 also includes receiving the secret if the authentication credential sent with the second request, or the information based upon the authentication credential, corresponds to the authentication credential in the credential message. The secret may be sent from the provisioning service 104 to the mobile device 102. The secret is received via communications link 106. In an embodiment, the secret is sent using a communications method that is different from the second communications method. The secret may be stored in memory of the mobile device using known tamper-resistant measures to protect the secret from unauthorized disclosure.

In an embodiment, the secret is encrypted by the provisioning service 104 using known encryption techniques, and after being received by the mobile device 102, the secret is decrypted using known decryption techniques. A cryptographic key may also be also sent from the provisioning service 104 to the mobile device 102 that can be used for decryption of the encrypted secret upon authentication of the mobile device 102. The encryption key may also be derived from the authentication credential along with some coded key in the application.

The method illustrated in FIG. 2 is secure because, for example, it includes a multi-step request processes that includes a first request in step 202 and a second request in step 206. In an embodiment, the first request initiates the provisioning process, while the authentication credentials provided with the second request authenticate the mobile device. The method can also include two-channel authentication, with an out-of-band communications method used to send the credential message in step 204. The method can also use known encryption techniques when sending the authentication credentials and/or the secret.

Figure 3:
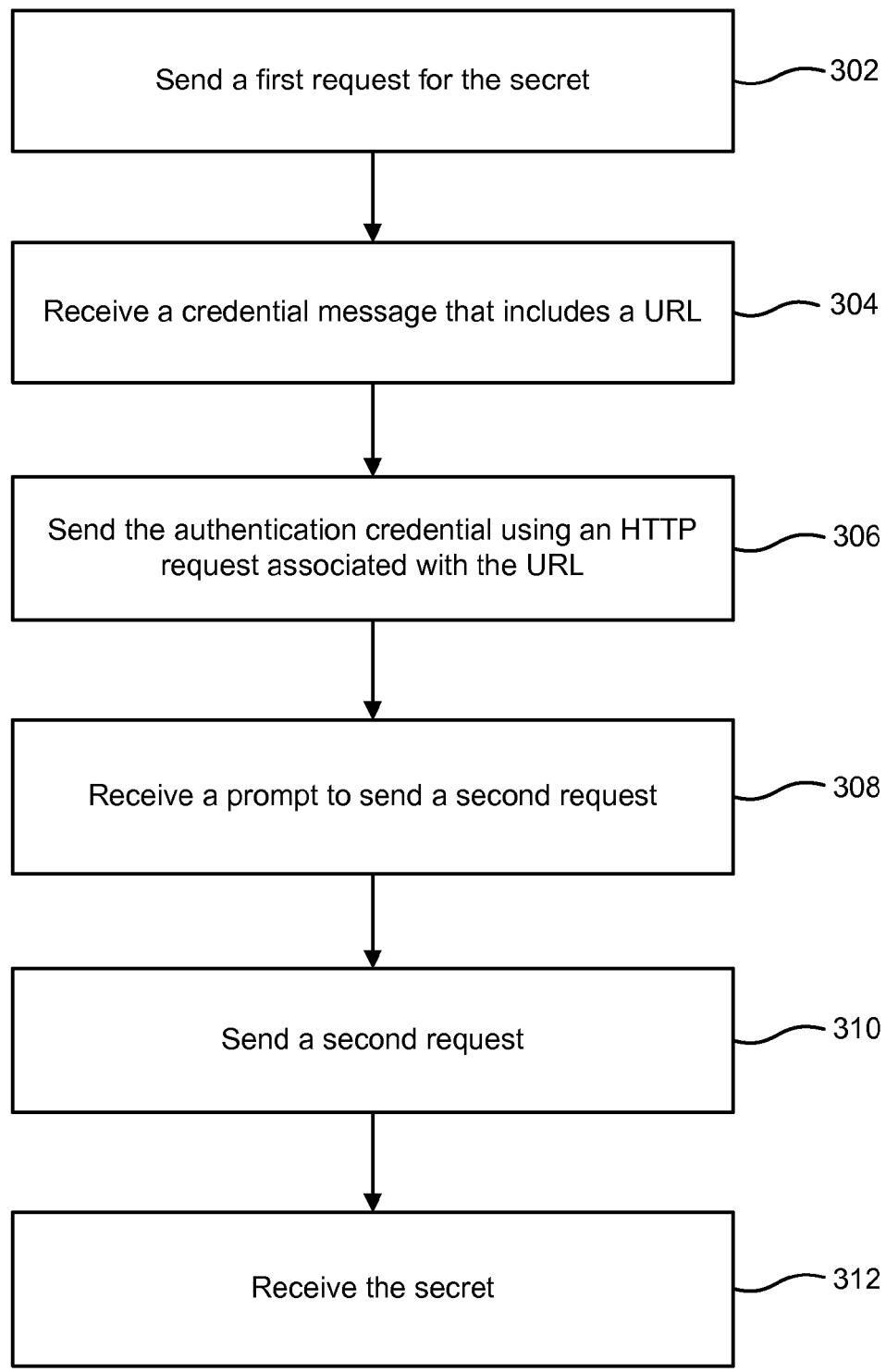
FIG. 3 is a simplified flowchart illustrating an exemplary method of obtaining a secret from a provisioning service according to another embodiment of the present invention.

FIG. 3 is a simplified flowchart illustrating an exemplary method of obtaining a secret from a provisioning service according to another embodiment of the present invention. The method includes sending a first request for the secret (302). The first request may be sent from the mobile device 102 to the provisioning service 104. Step 302 may be similar to step 202 described above, and may include sending a mobile device identifier with the first request.

The method also includes receiving a credential message that includes a URL (304). The credential message may be sent from the provisioning service 104 to the mobile device 102 in response to the first request. In one embodiment, the credential message includes an SMS message with a URL that is associated with an authentication credential included in the credential message. The authentication credential may include one or more nonces and/or the mobile device identifier sent with the first request. All or a portion of the authentication credential may be encrypted as explained previously. In an embodiment, a second message is sent from the provisioning service 104 to the mobile device 102 using an HTTP request with instructions to check for the SMS message.

The method also includes sending the authentication credential using an HTTP request associated with the URL (306). The authentication credential may be sent from the mobile device 102 to the provisioning service 104. In an embodiment, the URL links back to the provisioning service 104 to confirm that the credential message was received by the mobile device 102. For example, a user selecting or clicking the URL may open a browser window that links back to the provisioning service 104. This allows a user to confirm that the credential message was received by the mobile device 102 by simply selecting or clicking the URL. All or a portion of the authentication credential may be encrypted as explained previously.

The method also includes receiving a prompt to send a second request (308). The prompt may be sent from the provisioning service 104 to the mobile device 102 if the authentication credential received by the provisioning service 104 in step 306 corresponds to the authentication credential in the credential message.

The method also includes sending a second request (310) and receiving the secret (312). The second request may be sent from the mobile device 102 to the provisioning service 104. The second request may include the authentication credential received in step 304 or the mobile device identifier sent with the first request in step 302. The secret may be sent from the provisioning service 104 to the mobile device 102 in step 312 if the authentication credential corresponds to the authentication credential sent with the credential message. The secret may be encrypted as explained previously.

In an embodiment, the provisioning service 104 may define a period of time during which the second request in step 310 is expected. As an example, in one embodiment the period of time is one minute. The period of time may begin when the authentication credential is received in step 306 or when the prompt is sent in step 308. If the second request is not received during the period of time, the secret is not sent to the mobile device 104 in step 312. Restricting the second request to a particular period of time can provide additional security to the provisioning process.

The exemplary method illustrated in FIG. 3 provides a secure and user friendly method of obtaining a secret from a provisioning service. As an example, a provisioning application can include instructions to send the first and second requests (steps 302, 310) after a simple click of a button by a user. As explained previously, the provisioning application can be embodied in software and stored in memory of the mobile device 102. The provisioning application can also include instructions to send the HTTP request (step 306) after a user selects or clicks the URL. Thus, a secure provisioning method is provided that requires minimal user input or interaction.

Figure 4:
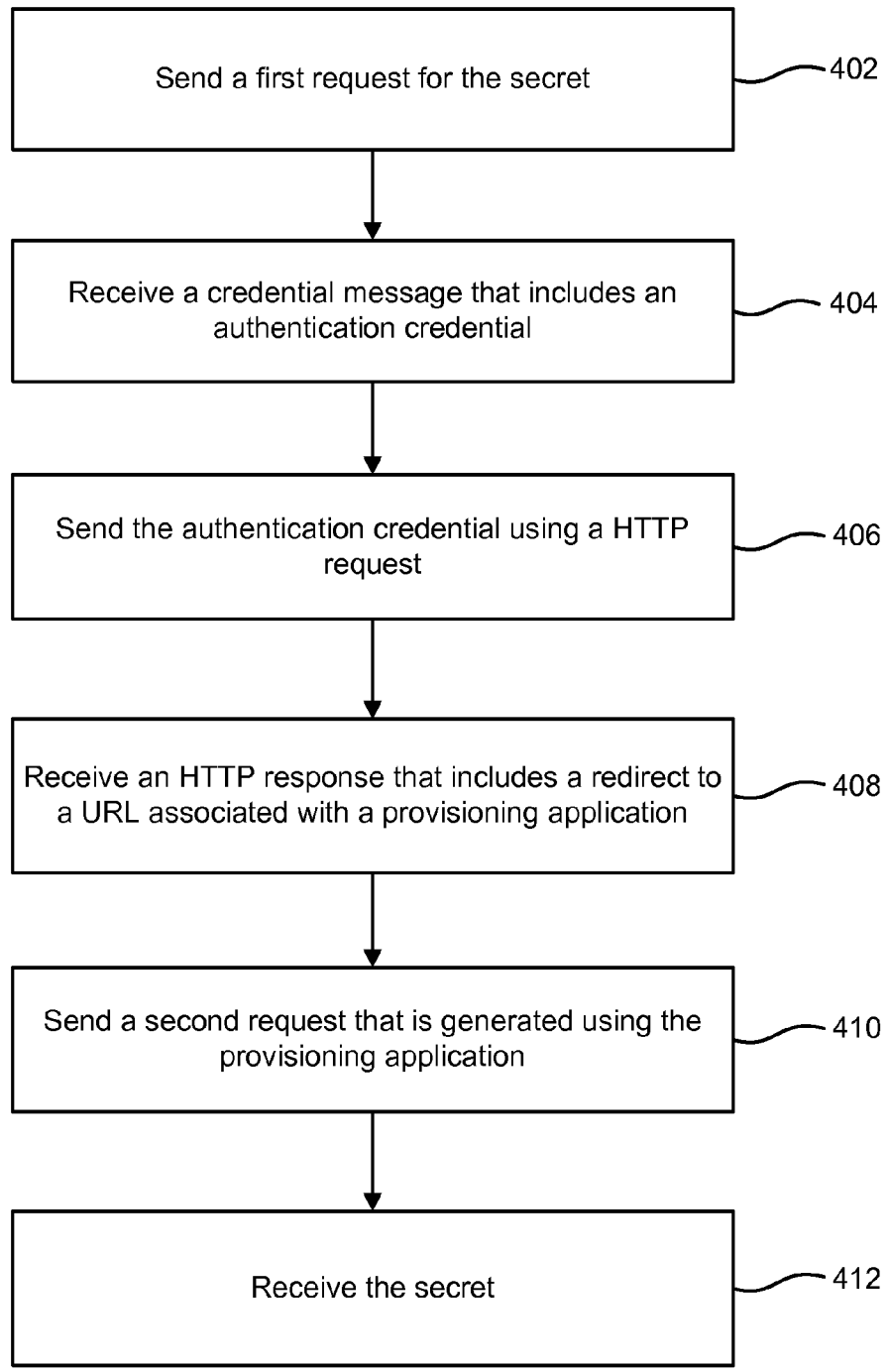
FIG. 4 is a simplified flowchart illustrating an exemplary method of obtaining a secret from a provisioning service according to another embodiment of the present invention.

FIG. 4 is a simplified flowchart illustrating an exemplary method of obtaining a secret from a provisioning service according to another embodiment of the present invention. The method includes sending a first request for the secret (402). The first request may be sent from the mobile device 102 to the provisioning service 104. Step 402 may be similar to steps 202, 302 described above, and may include sending a mobile device identifier with the first request.

The method also includes receiving a credential message that includes an authentication credential (404). The credential message may be sent from the provisioning service 104 to the mobile device 102 in response to the first request. In one embodiment, the credential message includes an SMS message with a URL that is associated with the authentication credential. The authentication credential may include one or more nonces and/or the mobile device identifier sent with the first request. All or a portion of the authentication credential may be encrypted as explained previously. In an embodiment, a second message is sent from the provisioning service 104 to the mobile device 102 using an HTTP request with instructions to check for the SMS message.

The method also includes sending the authentication credential using an HTTP request (406). The authentication credential may be sent from the mobile device 102 to the provisioning service 104. In an embodiment, the credential message in step 404 includes a URL that links back to the provisioning service 104 to confirm that the credential message was received by the mobile device 102. This allows a user to send the authentication credential by simply selecting or clicking the URL. All or a portion of the authentication credential may be encrypted as explained previously.

The method also includes receiving an HTTP response that includes a redirect to a URL associated with a provisioning application (408). The response may be sent from the provisioning service 104 to the mobile device 102 in response to receiving the HTTP request in step 406. In an embodiment, the URL provides the authentication credential, or information based on the authentication credential, to the provisioning application via a browser interface. As explained previously, the provisioning application may be embodied in software and stored in memory of the mobile device 102. The authentication credential or information based on the authentication credential may be encrypted as explained previously.

The method also includes sending a second request that is generated using the provisioning application (410). The second request may be sent from the mobile device 102 to the provisioning service 104. The second request may include the authentication credential or information based on the authentication credential. Encryption techniques may be used as explained previously.

In an embodiment, a provisioning application may include instructions to send the second request to the provisioning service 104 without requiring any user input. For example, the second request may be sent after receiving the HTTP response in step 408. Alternatively, the provisioning application may include instructions to send the second request after receiving instructions from a user. For example, a user may select a "Get Secret" button that is associated with the provisioning application and is visible to the user on a visual display of the mobile device 102.

The method also includes receiving the secret (412). The secret may be sent from the provisioning service 104 to the mobile device 102 if the authentication credential, or information based on the authentication credential, sent in step 410 corresponds to the authentication credential in the credential message. The secret may be encrypted as explained previously.

The exemplary method illustrated in FIG. 4 provides a secure and user friendly method of obtaining a secret from a provisioning service. As an example, a provisioning application can include instructions to send the first and second requests (steps 402, 410) after a simple click of a button by a user. Additionally, the provisioning application can include instructions to automatically send the second request after receiving the HTTP response in step 408. Thus, a secure provisioning method is provided that requires minimal user input or interaction.

Figure 5:
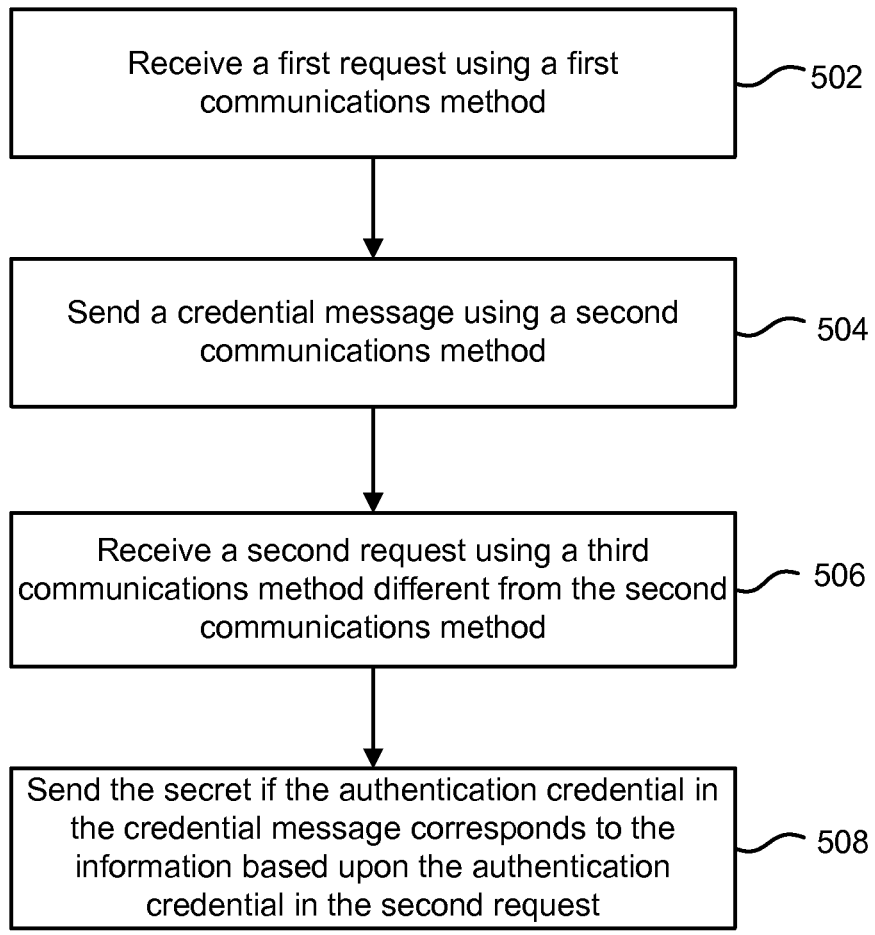
FIG. 5 is a simplified flowchart illustrating an exemplary method of provisioning a mobile device with a secret according to an embodiment of the present invention.
Figure 6:
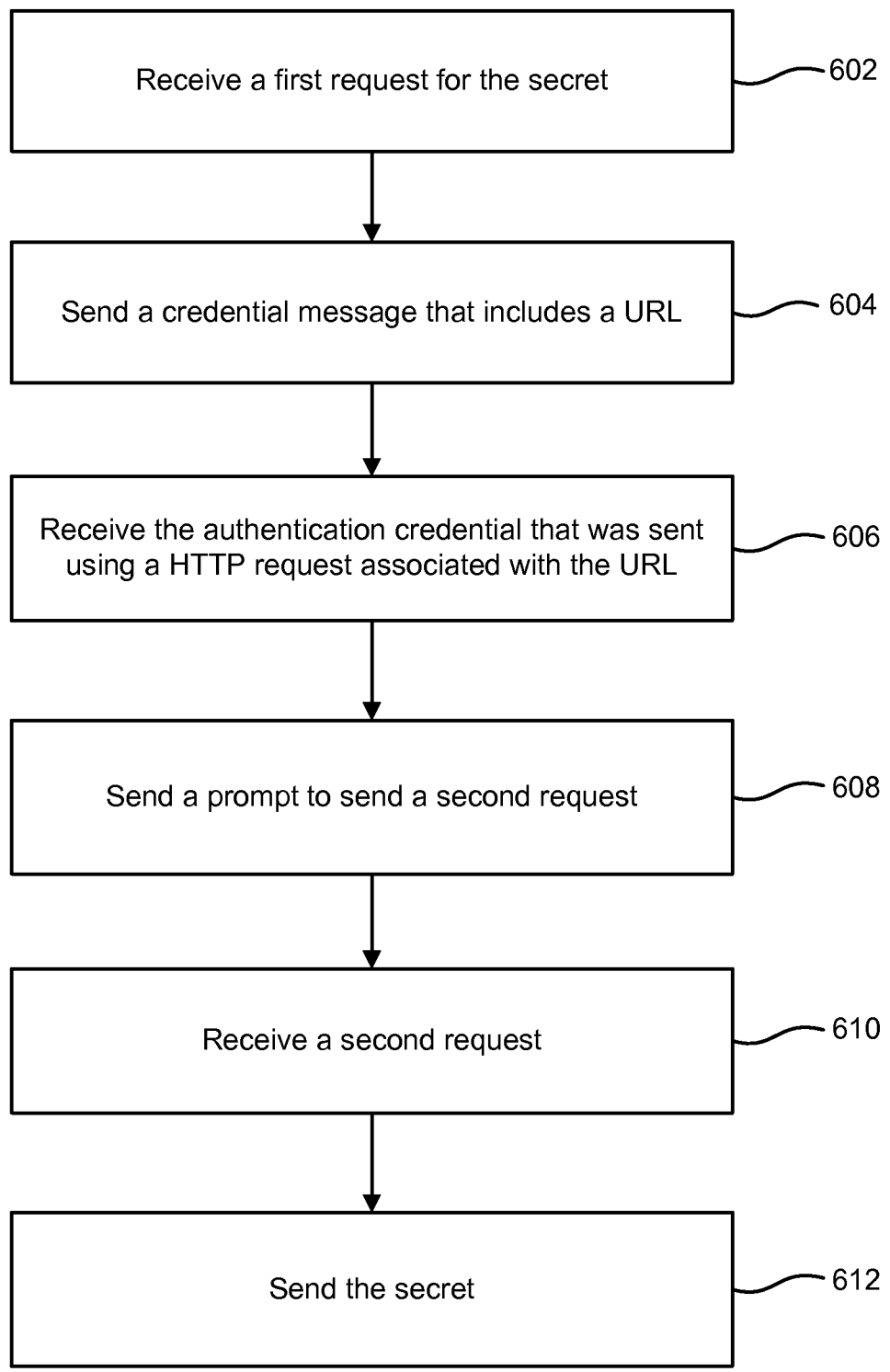
FIG. 6 is a simplified flowchart illustrating an exemplary method of provisioning a mobile device with a secret according to another embodiment of the present invention.
Figure 7:
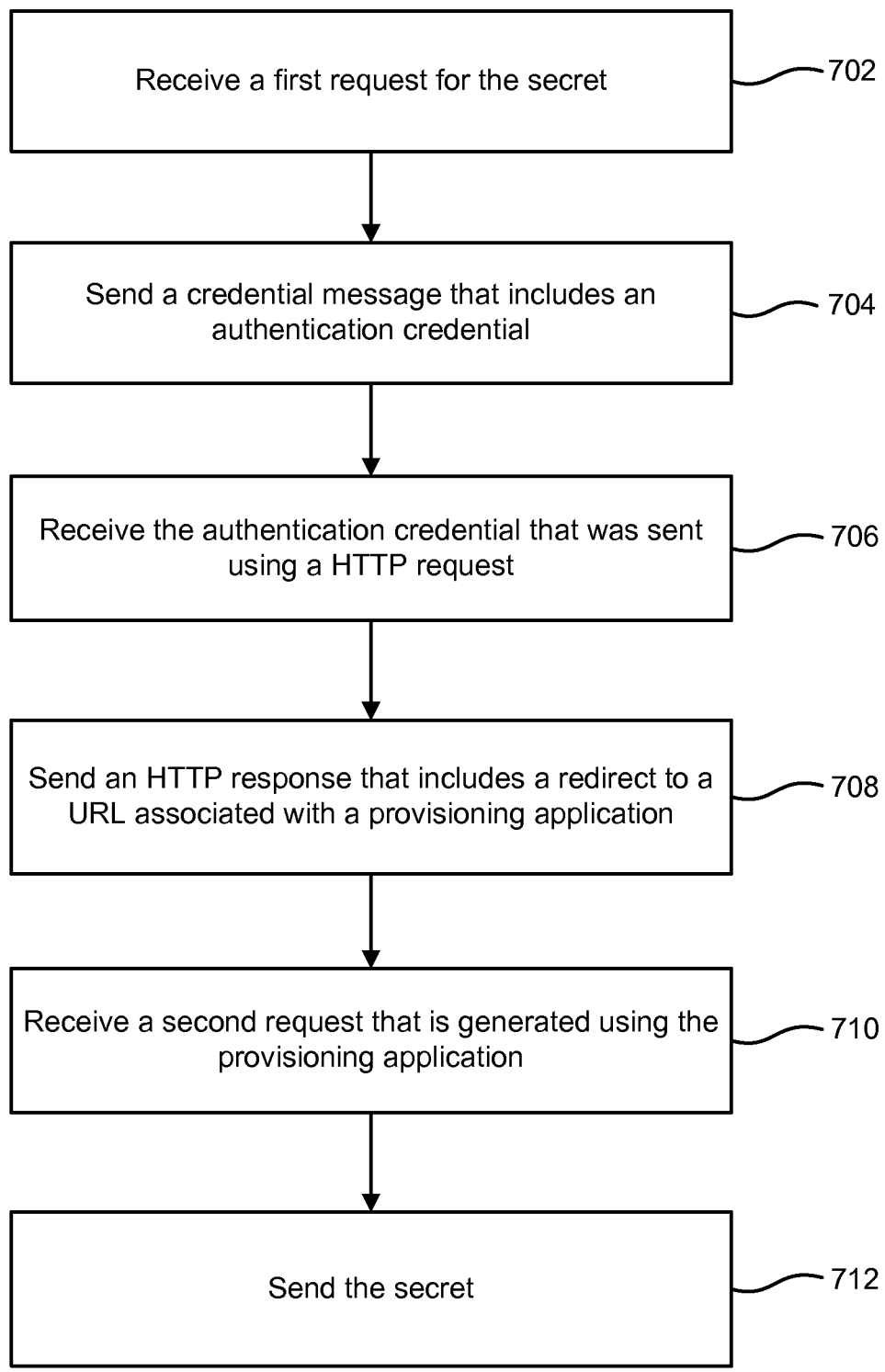
FIG. 7 is a simplified flowchart illustrating an exemplary method of provisioning a mobile device with a secret according to another embodiment of the present invention.

The exemplary methods illustrated in FIGS. 2-4 are generally provided from a perspective of the mobile device 102. Similar methods are illustrated in FIGS. 5-7, respectively, that are generally provided from a perspective of the provisioning service 104. Thus, features explained above with regard to FIGS. 2-4 also apply to FIGS. 5-7.

FIG. 5 is a simplified flowchart illustrating an exemplary method of provisioning a mobile device with a secret according to an embodiment of the present invention. The method illustrated in FIG. 5 includes receiving a first request using a first communications medium (502). The first request may be sent from the mobile device 102 to the provisioning service 104. The first request is sent via the communications link 106 using a first communications method. The first request may include a mobile device identifier associated with the mobile device 102. In an embodiment, the provisioning service 104 generates one or more nonces and associates the nonce(s) with the mobile device identifier.

The method also includes sending a credential message using a second communications method (504). The credential message may include an authentication credential such as the nonce(s) and the mobile device identifier. The credential message may be sent from the provisioning service 104 to the mobile device 102. The credential message is sent via the communications link 106 using a second communications method. Similar to step 204 above, the second communications method may be different from the first communications method.

The method also includes receiving a second request using a third communications method that is different from the second communications method (506). The second request may be sent from the mobile device 102 to the provisioning service 104. The second request may include the authentication credential, or information based upon the authentication credential, that was sent in step 504.

The method also includes sending the secret if the authentication credentials sent with the second request correspond to the authentication credentials in the credential message (508). The secret may be sent from the provisioning service 104 to the mobile device 102.

FIG. 6 is a simplified flowchart illustrating an exemplary method of provisioning a mobile device with a secret according to another embodiment of the present invention. The method includes receiving a first request for the secret (602). The first request may be sent from the mobile device 102 to the provisioning service 104. Step 602 may be similar to step 502 described above, and may include sending a mobile device identifier with the first request.

The method also includes sending a credential message that includes a URL (604). The credential message may be sent from the provisioning service 104 to the mobile device 102 in response to the first request. In one embodiment, the credential message includes an SMS message with a URL that is associated with an authentication credential included in the credential message.

The method also includes receiving the authentication credential that is sent using an HTTP request associated with the URL (606). The authentication credential may be sent from the mobile device 102 to the provisioning service 104. In an embodiment, the URL links back to the provisioning service 104 to confirm that the credential message was received by the mobile device 102.

The method also includes sending a prompt to send a second request (608). The prompt may be sent from the provisioning service 104 to the mobile device 102 if the authentication credential received by the provisioning service 104 in step 606 corresponds to the authentication credential that was sent by the provisioning service 104 in step 604.

The method also includes receiving a second request (610) and sending the secret (612). The second request may be sent from the mobile device 102 to the provisioning service 104. The secret may be sent from the provisioning service 104 to the mobile device 102 in step 312 if the authentication credential corresponds to the authentication credential sent with the credential message.

FIG. 7 is a simplified flowchart illustrating an exemplary method of provisioning a mobile device with a secret according to another embodiment of the present invention. The method includes receiving a first request for the secret (702). The first request may be sent from the mobile device 102 to the provisioning service 104. Step 702 may be similar to steps 502, 602 described above, and may include sending a mobile device identifier with the first request.

The method also includes sending a credential message that includes an authentication credential (704). The credential message may be sent from the provisioning service 104 to the mobile device 102 in response to the first request.

The method also includes receiving the authentication credential that was sent using an HTTP request (706). The authentication credential may be sent from the mobile device 102 to the provisioning service 104. In an embodiment, the credential message sent in step 704 includes a URL that links back to the provisioning service 104 to confirm that the credential message was received by the mobile device 102.

The method also includes sending an HTTP response that includes a redirect to a URL associated with a provisioning application (708). The response may be sent from the provisioning service 104 to the mobile device 102 in response to receiving the authentication credential that was sent using an HTTP request in step 706.

The method also includes receiving a second request that is generated using the provisioning application (710). The second request may be sent from the mobile device 102 to the provisioning service 104.

The method also includes sending the secret (712). The secret may be sent from the provisioning service 104 to the mobile device 102 if the authentication credential, or information based on the authentication credential, received in step 710 corresponds to the authentication credential sent with the credential message.

Figure 8:
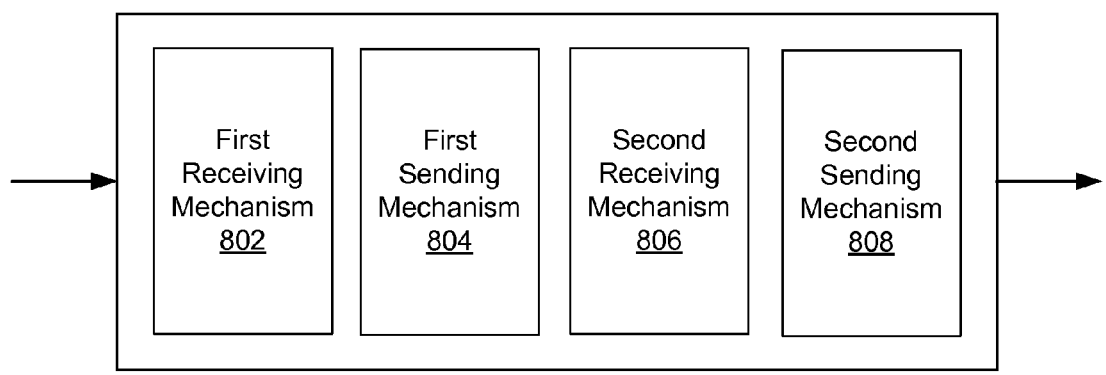
FIG. 8 is a simplified diagram of an exemplary apparatus for provisioning a mobile device with a secret according to an embodiment of the present invention.

FIG. 8 is a simplified diagram of an exemplary apparatus for provisioning a mobile device with a secret according to an embodiment of the present invention. The apparatus may be configured to implement the features of the provisioning service 104 described above. The apparatus includes a first receiving mechanism 802. The first receiving mechanism 802 may be configured to receiving a first request from the mobile device 102 using a first communications medium.

The apparatus also includes a first sending mechanism 804. The first sending mechanism 804 may be configured to send a credential message to the mobile device 102 using a second communications method. The second communications method may be different from the first communications method. In an embodiment, the first sending mechanism 804 may be configured to send an SMS message that includes a URL associated with an authentication credential.

The apparatus also includes a second receiving mechanism 806. The second receiving mechanism 806 may be configured to receive a second request from the mobile device 102 using a third communications method that is different from the second communications method.

The apparatus also includes a second sending mechanism 808. The second sending mechanism 808 may be configured to send the secret to the mobile device 102 if the authentication credentials sent by the first sending mechanism correspond to authentication credentials received by the second receiving mechanism with the second request.

While the present invention has been described in terms of specific embodiments, it should be apparent to those skilled in the art that the scope of the invention is not limited to the embodiments described herein. For example, it is to be understood that the features of one or more embodiments of this invention may be combined with one or more features of other embodiments of the invention without departing from the scope of the invention. Also, the examples and embodiments described herein are for illustrative purposes only, and various modifications or changes in light thereof will be evident to persons skilled in the art and are to be included within the spirit and purview of this application and the scope of the appended claims.

What is claimed is:

1. A method comprising:
   sending from a mobile device to a provisioning service a first request for a secret using a communications method other than a Short Message Service communications method, wherein the secret is used by the mobile device as a basis for generating One-Time Passwords, wherein the Short Message Service communications method is an out-of-band communications method, wherein the first request comprises a mobile device identifier of the mobile device comprising at least one of a telephone number of the mobile device, a mobile identification number of the mobile device, or an electronic identification number of the mobile device;
   receiving from the provisioning service at the mobile device a Short Message Service message using the Short Message Service communications method, wherein the Short Message Service message comprises an authentication credential, wherein the authentication credential comprises a nonce and the mobile device identifier;
   sending from the mobile device to the provisioning service a second request for the secret using a communications method other than the Short Message Service communications method, wherein the second request comprises the nonce received from the provisioning service and the mobile device identifier;
   receiving the secret from the provisioning service at the mobile device over a communications method other than the Short Message Service communications method in response to a determination that the nonce and the mobile device identifier sent in the Short Message Service message from the provisioning service to the mobile device correspond to the nonce and the mobile device identifier received from the mobile device in the second request; and
   storing the secret at the mobile device.

2. A method comprising:
   sending from a mobile device to a provisioning service a first request using a communications method other than a Short Message Service communication method, wherein the Short Message Service communications method is an out-of-band communications method, and wherein the first request comprises a mobile device identifier of the mobile device for the Short Message Service communications method;
   receiving from the provisioning service at the mobile device a credential message using the Short Message Service communications method and the mobile device identifier, wherein the credential message comprises an authentication credential, and wherein the authentication credential comprises a nonce;
   sending from the mobile device to the provisioning service a second request using a communications method other than the Short Message Service communications method, wherein the second request comprises information based upon the nonce received from the provisioning service;
   receiving a secret from the provisioning service at the mobile device in response to a determination that the information in the second request corresponds to the nonce in the credential message, wherein the mobile device uses the secret as a basis for generating One-Time Passwords; and
   storing the secret at the mobile device.

3. The method of claim 2 wherein the mobile device identifier comprises at least one of a telephone number of the mobile device, a mobile identification number of the mobile device, or an electronic identification number of the mobile device.

4. The method of claim 2 further comprising:
   sending the authentication credential from the mobile device to the provisioning service; and thereafter
   receiving from the provisioning service at the mobile device a prompt to send the second request.

5. The method of claim 4 wherein the credential message comprises a uniform resource locator (URL), and wherein sending the authentication credential comprises sending a hypertext transfer protocol (HTTP) request associated with the URL.

6. The method of claim 2 further comprising:
receiving from the provisioning service at the mobile device a prompt associated with the credential message using a communications method other than the Short Message Service communications method.

7. The method of claim 2 further comprising:
sending from the mobile device to the provisioning service the authentication credential using a hypertext transfer protocol (HTTP) request; and
receiving from the provisioning service at the mobile device an HTTP response, wherein the HTTP response comprises a redirect to a uniform resource locator (URL) associated with a provisioning application, and wherein the second request is generated using the provisioning application.

8. The method of claim 2 wherein the first request comprises a hypertext transfer protocol (HTTP) request.

9. The method of claim 2 further comprising generating a One-Time Password at the mobile device based upon the secret.

10. A method comprising:
receiving from a mobile device at a provisioning service a first request using a communications method other than a Short Message Service communication method, wherein the Short Message Service communications method is an out-of-band communications method, and wherein the first request comprises a mobile device identifier of the mobile device for the Short Message Service communications method;
sending from the provisioning service to the mobile device a credential message using the Short Message Service communications method and the mobile device identifier, wherein the credential message comprises an authentication credential, and wherein the authentication credential comprises a nonce;
receiving from the mobile device at the provisioning service a second request using a communications method other than the Short Message Service communications method, wherein the second request comprises information based upon the nonce sent by the provisioning service;
determining that the information in the second request corresponds to the nonce in the credential message; and
sending a secret from the provisioning service to the mobile device for storage at the mobile device in response to determining that the information in the second request corresponds to the nonce in the credential message, wherein the mobile device uses the secret as a basis for generating One-Time Passwords.

11. The method of claim 10 wherein the mobile device identifier comprises at least one of a telephone number of the mobile device, a mobile identification number of the mobile device, or an electronic identification number of the mobile device.

12. The method of claim 10 wherein the authentication credential further comprises the mobile device identifier.

13. The method of claim 10 further comprising:
receiving the authentication credential from the mobile device at the provisioning service; and thereafter sending from the provisioning service to the mobile device a prompt to send the second request.

14. The method of claim 13 wherein the credential message comprises a uniform resource locator (URL), and wherein receiving the authentication credential comprises receiving a hypertext transfer protocol (HTTP) request associated with the URL.

15. The method of claim 10 further comprising:
sending from the provisioning service to the mobile device a prompt associated with the credential message using a communications method other than the Short Message Service communications method.

16. The method of claim 10 further comprising:
receiving from the mobile device at the provisioning service the authentication credential using a hypertext transfer protocol (HTTP) request; and
sending from the provisioning service to the mobile device an HTTP response, wherein the HTTP response comprises a redirect to a uniform resource locator (URL) associated with a provisioning application, and wherein the second request is generated using the provisioning application.

17. The method of claim 10 wherein the first request comprises a hypertext transfer protocol (HTTP) request.

18. The method of claim 10 wherein the authentication credential comprises a digital signature.

19. The method of claim 10 wherein the secret comprises a cryptographic key.

20. The method of claim 10 wherein the authentication credential sent from the provisioning service to the mobile device is encrypted.

21. An apparatus comprising:
a first input interface to receive from a mobile device a first request using a first communications method other than a Short Message Service communication method, wherein the Short Message Service communications method is an out-of-band communications method, and wherein the first request comprises a mobile device identifier of the mobile device for the Short Message Service communications method;
a first output interface to send to the mobile device a credential message using the Short Message Service communications method and the mobile device identifier, wherein the credential message comprises an authentication credential, and wherein the authentication credential comprises a nonce;
a second input interface to receive from the mobile device a second request using a communications method other than the Short Message Service communications method, wherein the second request comprises information based upon the nonce sent by the first output interface;
a processing device to determine that the information in the second request corresponds to the nonce in the credential message; and
a second output interface to send a secret to the mobile device for storage at the mobile device in response to the determination that the information in the second request corresponds to the nonce in the credential message, wherein the mobile device uses the secret as a basis for generating One-Time Passwords.

* * * * *